April 28, 1925.
Re. 16,057
I. O. WRIGHT
DRAFT RIGGING
Original Filed April 29, 1920 2 Sheets-Sheet 1
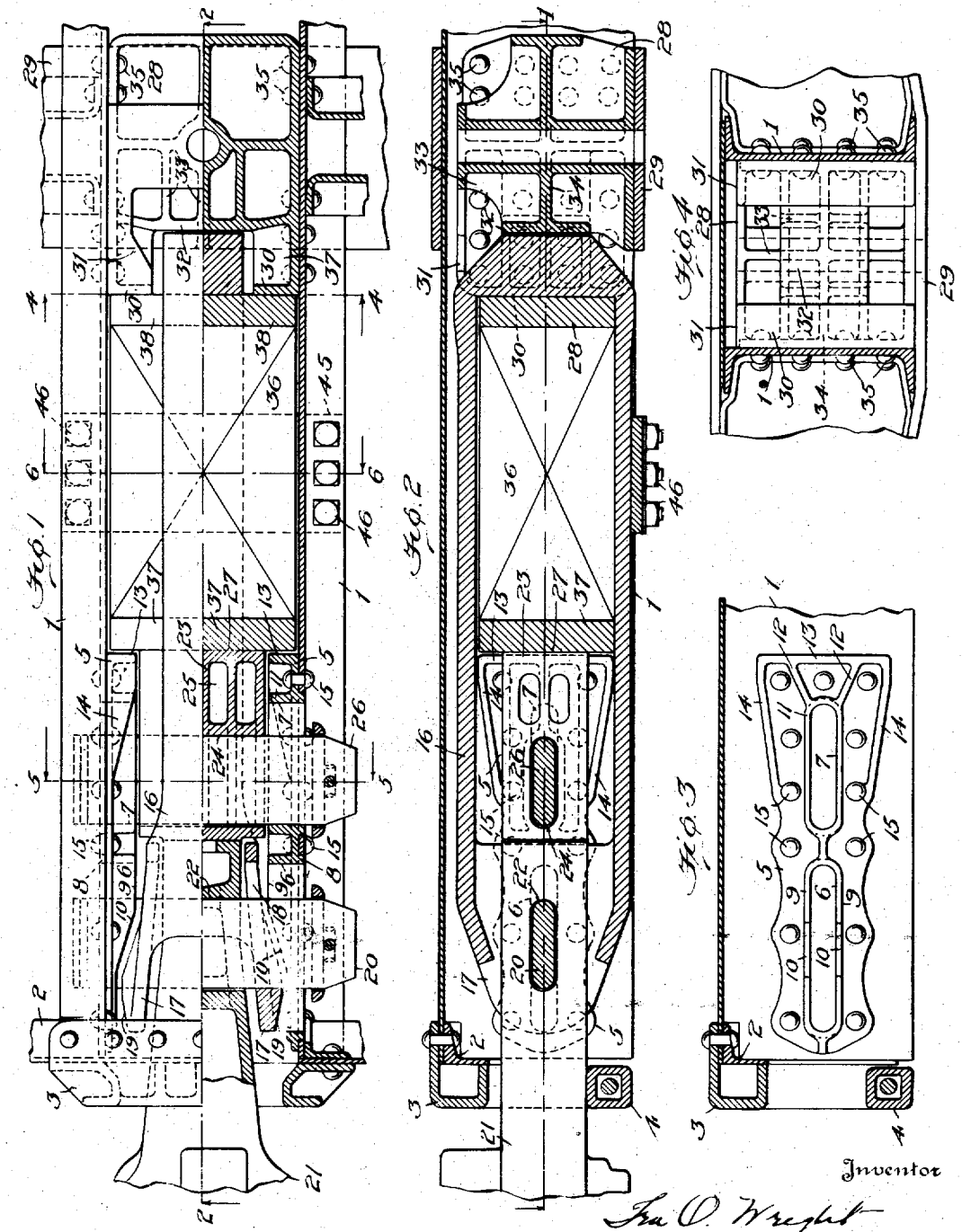
Inventor
Ira O. Wright
By Ernest F. Mechlin
his Attorney April 28, 1925. Re. 16,057

I. O. WRIGHT

DRAFT RIGGING

Original Filed April 29, 1920 2 Sheets-Sheet 2

Inventor

Ira O. Wright

By Ernest F. Mechlin his Attorney

Reissued Apr. 28, 1925. Re. 16,057

UNITED STATES PATENT OFFICE.

IRA O. WRIGHT, OF BALTIMORE, MARYLAND, ASSIGNOR, BY MESNE ASSIGNMENTS, TO THE SYMINGTON COMPANY, A CORPORATION OF MARYLAND.

DRAFT RIGGING.

Original No. 1,457,278, dated May 29, 1923, Serial No. 377,477, filed April 29, 1920. Application for reissue filed February 7, 1925. Serial No. 7,688.

*To all whom it may concern:*

Be it known that I, IRA O. WRIGHT, a citizen of the United States of America, residing at Baltimore, in the State of Maryland, have invented certain new and useful Improvements in Draft Rigging, of which the following is a specification.

The invention relates to draft rigging for railway cars and more particularly to that class of draft rigging especially designed for application to the underframes of freight cars, and consists in providing, in combination with the car sills, new and useful improvements for connecting the coupler to the cushioning mechanism and for connecting the cushioning mechanism to the car underframe so as to produce a simple, strong, efficient and reliable draft rigging.

To this end, the main features of my invention, broadly considered, consist in providing, in combination with a slidably connected yoke and coupler, a front stop mechanism adapted to provide a plurality of spaced points of support for the forward follower of the cushioning mechanism, and a rear stop member so constructed and arranged as to suitably brace the cushioning mechanism and connected parts and to transmit excessive loads to the car underframe without detriment to the latter.

The invention further consists in the various elements and combinations of elements hereinafter set forth, the novel features of the invention being pointed out in the claims at the end of the specification.

Referring to the drawings, wherein a specific embodiment of the invention has been illustrated:

Figure 1 is a view half in plan and half in horizontal section of the center draft sills of a freight car showing the improved draft rigging connected thereto, the section being taken on line 1—1 of Figure 2.

Figure 2 is a longitudinal vertical section taken on line 2—2 of Figure 1.

Figure 3 is a fragmentary view in side elevation of one of the draft or center sills, showing one of the cheek plates, the striking casting, end sill, and coupler carry iron being shown in section.

Figure 4 is a transverse sectional view on line 4—4 of Figure 1.

Figure 6:
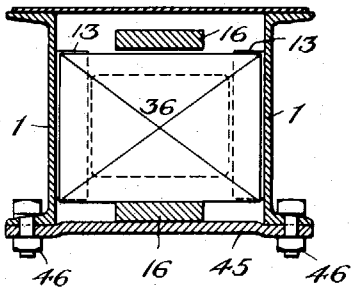

Figure 6 is a transverse sectional view on line 6—6 of Figure 1, the arrows adjacent the ends of the section lines 4—4, 5—5 and 6—6, indicating the direction in which these sections are viewed.

Figure 7:
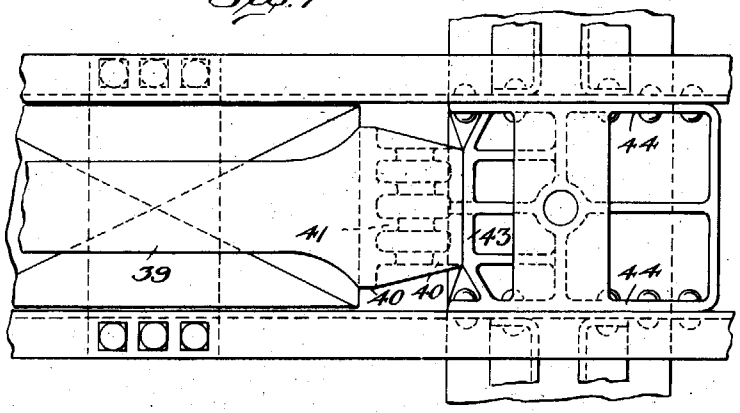

Figure 7 is a top plan view illustrating a slight modification in the form of yoke and rear stop mechanism from that shown in Figure 1.

Figure 8:
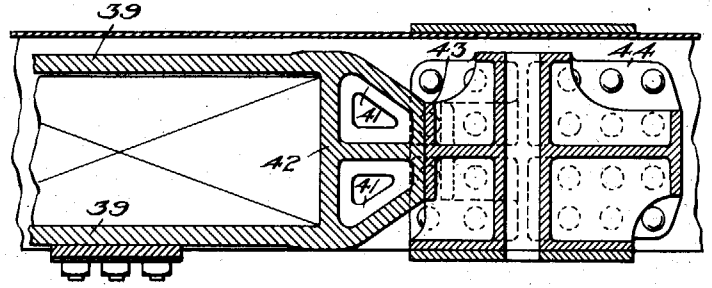
Figure 5:
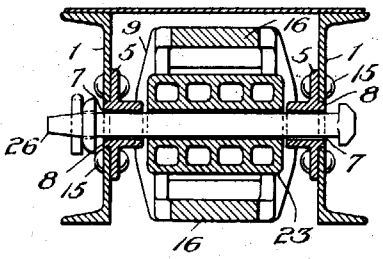
Figure 5 is a similar view on line 5—5 of Figure 1.

Figure 8 is a central longitudinal vertical section of the structure shown in Figure 7.

Throughout the specification and drawings like parts are designated by like reference characters.

The channel center sills of the car construction are designated by the reference numeral 1. 2 indicates the end sills, 3 a conventional form of striking casting, and 4 a coupler carry iron. All of the said parts may be of any suitable or desirable construction. Each sill 1 is provided with a plurality of longitudinally extending slots, and to the inner face of each sill is connected a cheek plate or front stop casting 5 each of which is provided with a pair of slots 6 and 7 which are adapted, when the cheek plates are in position, to register with said slots in the sills 1. Each cheek plate may be provided with a boss 8 on the outer face thereof, said bosses being adapted to surround the edges of the slots 6 and 7 and to extend through the slots in the center sills 1. On their inner or adjacent faces the cheek plates are provided with inwardly extending lips or flanges 9 which surround the side edges of the slot 6, and if desired these flanges 9 may be cut away as at 10 so as to provide clearance spaces for the side faces of the yoke hereinafter described. The rear slots 7 of each cheek plate are also provided with inwardly directed flanges 11 similar to those hereinbefore described with reference to the slots 6, and spaced from the rear edge of each flange 11 and preferably connected thereto by the webs 12, each of the said plates is provided with an inwardly directed flange 13. If desired, the top and bottom edges of this flange 13 may be reinforced by the flanges 14 clearly shown in Figures 1 and 3. Each cheek plate is firmly secured to the adjacent sill by means of a plurality of rivets 15.

Located between the sills is the yoke or coupler connecting means 16 which is preferably of the so-called vertical type, and which is provided at its forward end with a hooded head 17, the vertical side walls of which are provided with longitudinally extending key receiving slots 18. The forward portions of these slots are preferably furnished with reinforcing members 19 to increase the bearing at these points for the coupler key 20, and it is to clear these enlargements 19 that I cut away the flanges 9 at the points 10 as hereinbefore described. The key 20 is adapted to slidably connect the coupler 21 to the said yoke 16, the said key in the normal position of the gear engaging the rear wall of the slot 22 in the coupler and engaging at its forward edges against the forward ends of the slots 18 in the said yoke head, the said key being also adapted to extend through the slots 6 in the cheek plates and normally positioned at an intermediate point in the slots. It may here be noted that in the normal position of the parts the rear end of the slots 18 and the rear end of the slots 6 coincide. This construction permits an inward movement of the coupler independent of the yoke under buffing stresses. Seated between the arms of the yoke 16 and engaging the rear end of the coupler stem is a slotted follower or filler block 23, the said block being provided with a key slot 24, and it may be cored out as shown at 25 to lighten the same without detriment to its strength. A second key 26 is adapted to pass through the slot 24 and have its end portions extend through the cheek plate slots 7, and in the normal position of the parts the forward edges of this key engage abutments formed by the forward extremities of the said slots 7. The rear wall 27 of the block 23 normally projects a slight distance beyond the vertical end walls of the flanges 13 formed on the cheek plates.

At a suitable distance in rear of the cheek plates I provide a rear stop member 28 which may also form the center filler between the outwardly extending portions of the bolster 29. The said stop member may be provided with forwardly extending follower engaging lugs 30 which are suitably braced by the webs and flanges 31, and intermediate these stop lugs 30 the stop member is also preferably provided with an abutting face 32 which is also suitably braced by a plurality of vertically extending webs 33 and a transversely extending web 34. It will of course be understood that the combined back stop and center filler is suitably connected to the adjacent sills by means of rivets 35, and preferably some of these rivets also serve to connect the vertical members of the bolster 29 to the adjacent sill faces. The top and bottom webs 31 are preferably extended laterally and joined to the side walls of the casting 28 so as to form respectively the upper and lower horizontal walls therefor. Likewise the transversely extending web 34 is continued in effect forward of the flange 32 by the laterally extending centrally disposed webs 31 which merge into the stop faces 30. It will be evident that these stop lugs 30 are braced at the top and bottom respectively, by extensions from the upper wall and the lower wall or floor web of the casting and at the center by the extensions from the buffing floor or web 34 of the said casting. Intermediate the center web 34 and the upper and lower braces I also preferably provide additional braces for these stop faces 30. These additional braces extend from the marginal edges of the web 32, as will be clear from an inspection of Figures 2 and 4 of the drawings. By terminating the bottom wall or floor web of the casting at a point adjacent the flange or web 32 I provide for the entry of the rivets 35 between the wall and the buffing web 34, and at the same time provide a casting which is easy to manufacture since the opening between the said wall and the web 34 permits the ready removal of the cores used in the production of the casting. The rear end of the yoke 16 is normally preferably spaced a slight distance from the face 32 of the stop casting 28.

Within the yoke arms and bearing at its forward end against the face 27 of the block 23 and at its rear end against the inner face of the rear wall of the yoke, is the cushioning mechanism 36 which is only diagrammatically illustrated and which comprises a front follower 37, a rear follower 38 and any suitable cushioning mechanism interposed between the said followers. In the normal position of the parts as illustrated in Figure 1 it will be seen that the rear follower 38 engages the forward faces of the stop lugs 30, and the front follower engages the rear face 27 of the block 23. Under buffing movements the coupler is moved rearwardly and forces with it the block 23 which in turn moves the front follower 37 and transmits the load to the cushioning mechanism 36 which in turn is supported by the rear follower 38 and the stop lugs 30. On a forward movement the yoke and coupler move together and the load is transmitted from the yoke to the cushioning mechanism and from the latter to the block 23 and through the key 26 to the car sills. It often happens that the loads to which a draft rigging is subjected exceed the capacity of the cushioning mechanism and cause a bending of the followers of the draft rigging. My construction is particularly designed to afford efficient means for absorbing without detriment to the car this excessive overload.

Should the buffing load exceed the capacity of the cushioning mechanism and cause the follower 38 to bend, the rear end of the yoke will engage the abutting face 32 of the rear stop 28 and the load will be carried at three spaced points, namely, the stop lugs 30 and the abutting face 32. If the excessive load is caused by draft strains which would bend the key 26 any bending movement of this key would immediately permit the follower 37 to engage the stop faces 13 of the cheek plates and the excessive load be again transmitted to the car sills at four spaced points.

Figures 7 and 8 show a slight modification of the rear stop member, and in these figures the rear end of the yoke 39 is provided with a plurality of spaced walls 40 which are connected by a plurality of vertically extending webs 41 and a transversely extending web 42, the said structure forming a strong load-transmitting member which is adapted normally to contact the abutting face 43 provided on the back stop 44. In this form of my device the entire buffing load is transmitted directly to the central portion of the back stop, and lugs, such as 30 hereinbefore described, are not employed. In both forms of my device I have illustrated the yoke supported at an intermediate point by a conventional form of carry iron 45 which may be connected to the lower outstanding flanges of the sills 1 in any suitable manner. For convenience, the carry iron 45 is shown connected by means of a plurality of bolts 46.

Having now fully described my invention, although it is to be understood that the words used are to be taken in their descriptive and not in their limiting sense, what I claim and desire to secure by Letters Patent, is:

1. In a draft rigging, the combination with center sills, of a coupler, a yoke slidably connected thereto, a cushioning mechanism within the yoke, a block interposed between the coupler and said mechanism and movable in one direction with the said coupler, means for connecting said block to the said sills, said means serving to transmit draft strains thereto, and means carried by the said sills and projecting inwardly therefrom for receiving draft strains when the same exceed the capacity of the first named means.

2. In a draft rigging, the combination with center sills, of a coupler, a yoke, a cushioning mechanism within the yoke, cheek plates carried by the sills, abutments on said cheek plates, and means interposed between the coupler and cushioning mechanism for normally spacing said mechanism from said abutments, said means being movable by excessive draft strains to permit said cushioning mechanism to contact with said abutments.

3. In a draft rigging, the combination with car sills, of cheek plates connected to the adjacent faces of said sills, each of said cheek plates being provided with a plurality of spaced abutments, one of said abutments on each of said plates being adapted to receive draft strains and the other of said abutments being adapted to engage a movable element of the cushioning mechanism under excessive draft strains.

4. In a draft-rigging, the combination with center sills and a coupler, of a yoke slidably connected to said coupler, a cushioning mechanism within the yoke, means interposed between the coupler and cushioning mechanism adapted to transmit buffing forces to said mechanism, and adapted to transmit draft forces to the said sills, and stops carried by the said sills, said stops being adapted to engage the said mechanism under excessive draft strains.

5. In a draft rigging, the combination with center sills, a coupler, a vertical yoke slidably connected thereto, of slotted cheek plates connected to the adjacent faces of said sills, a cushioning mechanism within the yoke, and means carried by the said sills and interposed between the coupler and cushioning mechanism for transmitting draft forces to the said sills and transmitting buffing forces to the said mechanism, and stops carried by the said cheek plates, said stops being adapted to engage the cushioning mechanism under excessive draft strains to provide additional means for transmitting said excessive draft strains to the car sills.

6. In a draft rigging, the combination with car sills, a coupler, a key connected yoke and front stop mechanism, a rear stop, means carried by said last named stop for engaging said cushioning mechanism and additional means on said stop for engaging said yoke upon a distortion of said cushioning mechanism under excessive buffing loads, said yoke normally being spaced from said rear stop.

7. In a draft rigging, the combination with center sills, of front stop members connected thereto, a rear stop member and a second supplemental stop member positioned in rear thereof and connected to the said sills, a coupler, a yoke slidably connected thereto, cushioning mechanism within the yoke and arranged between said first named stop members, said mechanism being normally adapted to engage one of the said stop members and being spaced from the other, and means carried by the sills and interposed between the coupler and cushioning mechanism for transmitting draft forces to said sills, said other stop member being adapted to engage the cushioning mechanism when the draft strains exceed the capacity of said means.

8. In a draft rigging, the combination with car sills, of a coupler, a key connected yoke and front stop mechanism a follower, and means movable with said follower for engaging said coupler, said follower being provided with stop engaging faces, the coupler engaging face of said means and said stop engaging faces of the said follower being arranged in different vertical planes.

9. In a draft rigging, the combination with car sills, of a coupler, a yoke connected thereto, stop members carried by the car sills, a follower interposed between said sills and provided with stop engaging faces in one plane, and means for transmitting stresses from said follower to said stop members in a different plane.

10. In a draft rigging, the combination with slotted center sills, slotted cheek plates connected to said sills, of a coupler, a yoke having a hooded forward end adapted to receive said coupler, the arms of said yoke being disposed in spaced horizontal planes, a key for operatively connecting the coupler and yoke, a slotted follower positioned in rear of said coupler, and a key passing through said follower, said key being slidably received in said cheek plate slots, the arms of said yoke being spaced above and below said follower key.

11. In a draft rigging, the combination with slotted center sills having cheek plates connected thereto, each of said cheek plates being provided with a plurality of spaced horizontally disposed slots therein, of a slotted coupler, a hooded vertical yoke having elongated slots in said hood portion, means comprising a horizontally disposed key for slidably connecting said coupler and yoke, portions of said key being slidably received in one of said slots in each plate, a slotted follower normally adapted to engage said coupler, and means passing through said follower and the second slot in each cheek plate, said means being adapted to support said follower and to transmit to said cheek plates draft strains imposed upon said yoke by said coupler.

12. In a draft rigging, the combination with slotted center sills, of cheek plates connected to said sills, said cheek plates each having a pair of spaced horizontally disposed slots therein, a hooded vertically arranged yoke located between said sills, a coupler, means including a transversely arranged key for slidably connecting said coupler and yoke, portions of said key being adapted to extend within the forward slot of each of said cheek plates, a cushioning mechanism within the yoke, a slotted follower interposed between the cushioning mechanism and the rear of said coupler, and a second key extending through the rearward slots of said cheek plates and through said follower, said last named key being spaced vertically from said yoke arms and adapted to transmit draft forces imposed upon said yoke by said coupler to the said sills in alinement with the webs thereof.

In testimony whereof I affix my signature.

IRA O. WRIGHT.